(12) United States Patent
Salter et al.

(10) Patent No.: US 8,666,039 B2
(45) Date of Patent: Mar. 4, 2014

(54) VOICE TRAFFIC GATEWAY

(75) Inventors: Robert John Salter, Lyndhurst (GB);
Stephen Matthew Allan Jenner,
Fordingbridge (GB)

(73) Assignee: BAE Systems PLC, London (GB)

( * ) Notice: Subject to any disclaimer, the term of this patent is extended or adjusted under 35 U.S.C. 154(b) by 0 days.

(21) Appl. No.: 14/000,284

(22) PCT Filed: Feb. 16, 2012

(86) PCT No.: PCT/GB2012/050347
§ 371 (c)(1),
(2), (4) Date: Sep. 9, 2013

(87) PCT Pub. No.: WO2012/110818
PCT Pub. Date: Aug. 23, 2012

(65) Prior Publication Data
US 2013/0343531 A1   Dec. 26, 2013

(30) Foreign Application Priority Data

Feb. 18, 2011   (EP) .................................... 11275033
Feb. 18, 2011   (GB) ................................. 1102869.3

(51) Int. Cl.
*H04M 1/64* (2006.01)
*H04M 11/00* (2006.01)
*H04M 3/00* (2006.01)

(52) U.S. Cl.
USPC ..................... 379/88.12; 379/196; 379/88.22; 379/88.24; 379/188

(58) Field of Classification Search
USPC ................. 379/88.12, 196, 188, 67.1, 88.16, 379/88.22, 88.24, 88.18
See application file for complete search history.

(56) References Cited

U.S. PATENT DOCUMENTS 6,404,775 B1 *   6/2002   Leslie et al. .................. 370/466
7,069,432 B1     6/2006   Tighe et al.
(Continued)

FOREIGN PATENT DOCUMENTS

| GB | 2 449 410 A | 11/2008 |
| WO | WO 03/075530 A1 | 9/2003 |
| WO | WO2006/107563 A2 | 10/2006 |
| WO | WO 2008/011239 A2 | 1/2008 |
| WO | WO 2010/144737 A2 | 12/2010 |

OTHER PUBLICATIONS

International Search Report (PCT/ISA/210) issued on Apr. 18, 2012, by the United Kingdom Patent Office as the International Searching Authority for International Application No. PCT/EP2012/050347.
(Continued)

*Primary Examiner* — Thjuan K Addy
(74) *Attorney, Agent, or Firm* — Buchanan Ingersoll & Rooney PC

(57) ABSTRACT

A voice traffic gateway including: a voice traffic input, a voice traffic output, a first domain router, non-secure warning (NSW) tone application apparatus and a signalling filter. The input receives voice traffic including voice messages and signalling messages from a first traffic domain. The output delivers output voice messages and signalling messages to a second, different traffic domain. The first domain router routes voice messages to the NSW apparatus and routes signalling messages to the signalling filter. The NSW apparatus applies a NSW tone to a received voice message to form an output voice message. The signalling filter compares a feature of a received signalling message with a reference feature. The signalling filter will pass a signalling message if the signalling message feature is the same as the reference feature and will block a signalling message if the signalling message feature is not the same as the reference feature.

16 Claims, 6 Drawing Sheets

(56) References Cited

U.S. PATENT DOCUMENTS

| | | |
|---|---|---|
| 7,281,043 B1 * | 10/2007 | Davie .......................... 709/226 |
| 7,562,389 B1 | 7/2009 | Goyal et al. |
| 2007/0127453 A1 | 6/2007 | Shibata |
| 2008/0019381 A1 | 1/2008 | Mills et al. |
| 2008/0133761 A1 | 6/2008 | Polk |
| 2008/0141331 A1 | 6/2008 | Taker et al. |
| 2010/0082828 A1 | 4/2010 | Jennings et al. |
| 2010/0115630 A1 | 5/2010 | Maire et al. |

OTHER PUBLICATIONS

European Search Report issued on Jun. 14, 2011.
United Kingdom Search Report issued on May 12, 2011.
International Search Report (PCT/ISA/210) issued on Apr. 18, 2012, by the United Kingdom Patent Office as the International Searching Authority for International Application No. PCT/EP2012/050338.
Written Opinion (PCT/ISA/237) issued on Apr. 18, 2012, by the European Patent Office as the International Searching Authority for International Application No. PCT/EP2012/050338.
European Search Report issued on Jun. 9, 2011.
United Kingdom Search Report issued on May 11, 2011.
"Cisco Unified Communications Manager Security Guide", Release 8.5(1), Cisco Systems 2010, pp. 8-1 to 8-4, Text Part No. OL-24124-01; Available from http?//www.cisco.com/en/US/docs/voice_ip_comm/cucm/security/8_5_1/secugd/sectone.htlm [Accessed May 10, 2011], See Chapter 8 (Configuring Secure and Nonsecure Indication Tones).

* cited by examiner

VOICE TRAFFIC GATEWAY

The invention relates to a voice traffic gateway.

It is known for communications networks to incorporate a number of separate traffic domains, often referred to as virtual private networks, connecting sub-sets of subscribers to a communications network. It is generally intended that voice call traffic flowing within a traffic domain remains within that domain only, however situations can arise in which a subscriber in one domain wishes to call a subscriber in a different domain. In communications networks in which subscribers in the different traffic domains have different privileges or security levels placing a call from one domain to another can give rise to a security threat, since the existence of such a call may allow a covert communications channel to be established between the two traffic domains.

In addition, it may be desirable during a telephone call between subscribers in two different domains to be able to indicate to one subscriber to the call that the other subscriber to the call is located in a domain having a different privilege or security level, and is therefore a non-trusted party. This is known to be done in the case of analogue voice calls by applying a non-secure warning tone to the voice call received from the non-trusted party, so that an audible warning is heard over the call by the receiving party.

A first aspect of the invention provides a voice traffic gateway comprising:

a voice traffic input arranged to receive voice traffic from a first traffic domain of a communications network, the voice traffic comprising voice messages and signalling messages;

a voice traffic output arranged to deliver output voice messages and output signalling messages to a second, different traffic domain of the communications network;

a first domain router coupled to the voice traffic input and arranged to route voice messages received from the first traffic domain to a non-secure warning tone application apparatus and to route signalling messages received from the first traffic domain to a signalling filter, wherein the non-secure warning tone application apparatus is arranged to apply a non-secure warning tone to each voice message that it receives to form a respective output voice message, and the signalling filter is arranged to compare a feature of each signalling message that it receives with a reference feature and is further arranged to pass a said signalling message as an output signalling message if said feature is the same as the reference feature and to block a said signalling message if said feature is not the same as the reference feature.

The voice traffic gateway may enable voice calls to be made between callers in two different traffic domains of a communications network. The non-secure warning tone application apparatus may enable the voice traffic gateway to apply a warning tone to a voice call to alert a recipient to the fact that the call has originated from a different traffic domain. The signalling filter may enable the voice security gateway to prevent a covert message being transmitted with a signalling message and may prevent a cover communications channel being established between the two different traffic domains.

In an embodiment, each voice message and signalling message received from the first traffic domain comprises a first domain identification label, and the voice traffic input and the voice traffic output comprise a shared communications port, and wherein the voice traffic gateway further comprises:

a first domain separator arranged to receive the voice traffic and to read the domain identification label of each voice message and each signalling message, and remove the first domain identification label from each voice message and each signalling message having an identification label of the first traffic domain; and a second domain separator arranged to apply a second domain identification label to each voice message and each signalling message to be output to the second domain; and routing apparatus arranged to route voice traffic received from the first domain from the communications port to the first domain separator and to route voice traffic to be output to the second domain from the second domain separator to the communications port.

The voice traffic gateway may be used with a communications network in which voice traffic belonging to the two different traffic domains is transmitted across a shared network, the traffic of each domain being identified by its respective domain identification label.

In an embodiment, the voice traffic gateway is arranged to receive voice traffic from each of a plurality of different traffic domains and to output voice traffic to each of said traffic domains and the voice traffic gateway comprises:

a said plurality of domain separators each arranged to receive respective voice traffic and to read the domain identification label of each voice message and each signalling message of said voice traffic, and to remove the respective domain identification label from each voice message and each signalling message having an identification label of its respective domain and to apply said respective domain identification label to each voice message and each signalling message to be output to its respective domain;

a said plurality of non-secure warning tone application apparatus and signalling filters;

a said plurality of domain routers, each coupled to a respective domain separator and to at least one other domain router through a respective said non-secure warning tone application apparatus and a respective said signalling filter, and wherein each domain router is arranged to route voice traffic received from its respective domain separator to a respective said non-secure warning tone application apparatus or a respective said signalling filter and each domain router is further arranged to route voice traffic received from a respective said non-secure warning tone application apparatus or a respective said signalling filter to its respective said domain separator.

The voice traffic gateway may be used with a communications network in which voice traffic belonging to each of a plurality of different traffic domains is transmitted across a shared network, the traffic of each domain being identified by its respective domain identification label. The voice traffic gateway may be used to enable communication between any pre-selected pair of the plurality of different traffic domains within the communications network.

In an embodiment, the routing apparatus is further arranged to decrypt voice traffic received from the communications port prior to routing said traffic to the respective domain separator and is further arranged to encrypt traffic to be output prior to routing said traffic to the communications port. The voice traffic gateway may therefore be used to enable encrypted communication between two different traffic domains within a communications network In an embodiment, said feature of each signalling message comprises at least one of a source address, a destination address, signalling message format, the content of a signalling message field. The signalling filter may therefore be arranged only to pass signalling messages which originate from an acceptable source, which are addressed to an acceptable destination, which have an acceptable message format or which have acceptable content in one or more pre-selected message fields.

In an embodiment, the signalling messages have a bit rate and the signalling filter is further arranged to control the bit rate to be not greater than a pre-selected threshold bit rate. This may enable the signalling filter to throttle the bit rate of a signalling message to a minimum bit rate required to successfully transmit signalling messages and may thereby disrupt transmission of covert messages with signalling messages.

In an embodiment, the signalling messages comprise signalling packets and the signalling filter is arranged to: convert received signalling packets into a first serial bit stream; convert the first serial bit stream into a second serial bit stream having a pre-selected, lower bit rate; and convert the second serial bit stream into output signalling packets. The bit rate of a signalling message may thereby be reduced to a pre-selected lower bit rate, throttling the bit rate of the signalling message.

In an embodiment, each traffic domain has a trust level and the non-secure warning tone apparatus is operable to apply the non-secure warning tone only to messages being sent from a traffic domain having a first trust level to a traffic domain having a second, higher trust level. Only the more trusted party to a call may hear the non-secure warning tone, alerting them that the other caller is less trusted, without the less trusted caller being aware that they are talking to a more trusted party.

In an embodiment, each voice message comprises a voice signal comprising a sequence of voice samples and the non-secure warning tone application apparatus comprises:
a port arranged to receive a said voice signal;
a non-secure warning tone signal source arranged to generate a non-secure warning tone signal comprising a plurality of tone samples; and
signal modification apparatus arranged to selectively include tone samples in the sequence of voice samples.

The non-secure warning tone application apparatus may apply a non-secure warning tone to a packetized voice signal while minimising disruption of the voice signal. The apparatus may modify a voice signal by including tone samples which may corrupt a data signal comprising data samples which is being transmitted across a voice signal path through the non-secure warning tone application apparatus, and may prevent a data signal from being covertly transmitted across the voice signal path.

In an embodiment, the signal modification apparatus is arranged to select a plurality of the voice samples and replace each selected voice sample with a respective tone sample. The tone samples may be provided with a constant amplitude which may ensure that they are always audible and easily recognised. Replacement of voice samples with tone samples may enable a caller to adjust the voice call volume relative to the non-secure warning tone volume. Replacement of voice samples with tone samples may provide a resulting voice call having a non-secure warning tone which is easy and pleasant to listen to.

In an embodiment, the signal modification apparatus is arranged to select a plurality of the voice samples and to combine each selected voice sample with a respective tone sample to form a combined sample. This may enable the relative and absolute levels of the tone samples and the voice samples to be varied while clamping the minimum and maximum non-secure warning tone amplitude on the voice call between pre-selected limits.

In an embodiment, each combined sample comprises a weighted average of the respective voice sample and tone sample.

In an embodiment, the signal modification apparatus is arranged to select alternate voice samples. A non-secure warning tone may thereby be applied to the voice signal which may be heard without obscuring the voice call and may maximise the intelligibility of a voice call having a non-secure warning tone on it.

In an embodiment, the signal modification apparatus is arranged to select one in up to every sixteen voice samples. In an embodiment, the signal modification apparatus is arranged to select one in up to every four voice samples. This may reduce the amount of signal processing required without affecting the intelligibility of the voice call.

In an embodiment, the non-secure warning tone application apparatus is arranged to periodically modify the voice signal. The non-secure warning tone application apparatus may thereby apply a non-secure warning tone during only selected parts of a voice call. A periodically repeating non-secure warning tone may thus be applied to a packetized voice signal. A non-secure warning tone may therefore be applied which may not distract a receiving party from the content of a voice call.

In an embodiment, the non-secure warning tone signal source is arranged to generate a tone signal comprising periodically occurring tone periods each comprising a plurality of tone samples and the signal modification apparatus is arranged to selectively include tone samples in the sequence of voice samples during the tone periods. A periodic modification of the voice signal is therefore achieved modifying the voice signal with a periodic tone signal, which only comprises tone samples within periodically occurring tone periods.

In an embodiment, the voice messages and the signalling messages have a voice over internet protocol signal format and comprise voice message packets and signalling message packets.

In an embodiment, the sequence of voice samples comprises a sequence of voice message packets and the apparatus further comprises voice signal validation apparatus arranged to compare a structural feature of a voice message packet of the voice signal with a reference structural feature and arranged to determine whether said structural feature is the same as said reference feature. If said structural feature is the same as said reference feature the voice signal validation apparatus may validate the voice message packet as comprising an acceptable voice message packet. If said structural feature is not the same as said reference feature the voice signal validation apparatus may reject the voice message packet as comprising an acceptable voice message packet. This may prevent unacceptable voice message packets or data packets from being transmitted by the non-secure warning tone application apparatus.

In an embodiment, said structural feature comprises at least one of packet length, packet header and voice header.

In an embodiment, each voice message packet has a packet length of between 10 ms and 50 ms. In an embodiment, the non-secure warning tone signal has a lower signal level than the voice signal. The non-secure warning tone may therefore be heard in the background of a voice call.

Embodiments of the invention will now be described by way of example only, with reference to the accompanying drawings, in which.

Figure 1:
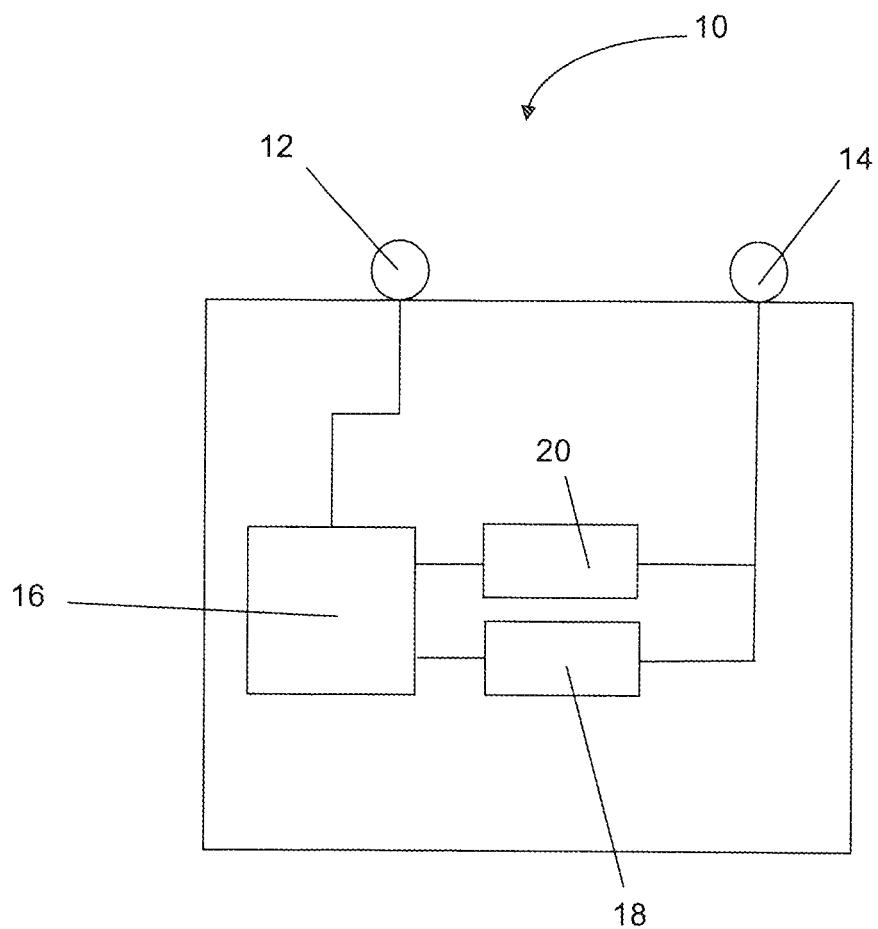
FIG. 1 is a schematic representation of a voice traffic gateway according to a first embodiment of the invention.

Referring to FIG. 1, a first embodiment of the invention provides a voice traffic gateway 10 comprising a voice traffic input 12, a voice traffic output 14, a first domain router 16, non-secure warning tone application apparatus 18 and a signalling filter 20.

The voice traffic input 12 is arranged to receive voice traffic from a first traffic domain of a communications network. The voice traffic comprises voice messages and signalling messages. The voice traffic output 14 is arranged to deliver output voice messages and output signalling messages to a second, different traffic domain of the communications network.

The first domain router 16 is coupled to the voice traffic input and is arranged to route voice messages received from the first traffic domain to the non-secure warning tone application apparatus 18. The first domain router 16 is further arranged to route signalling messages received from the first traffic domain to the signalling filter 20.

The non-secure warning tone application apparatus 18 is arranged to apply a non-secure warning tone to a received voice message to form an output voice message.

The signalling filter 20 is arranged to compare a feature of a received signalling message with a reference feature. The signalling filter 20 will pass a signalling message as an output signalling message if the signalling message feature is the same as the reference feature. The signalling filter 20 will block a signalling message if the signalling message feature is not the same as the reference feature.

Figure 2:
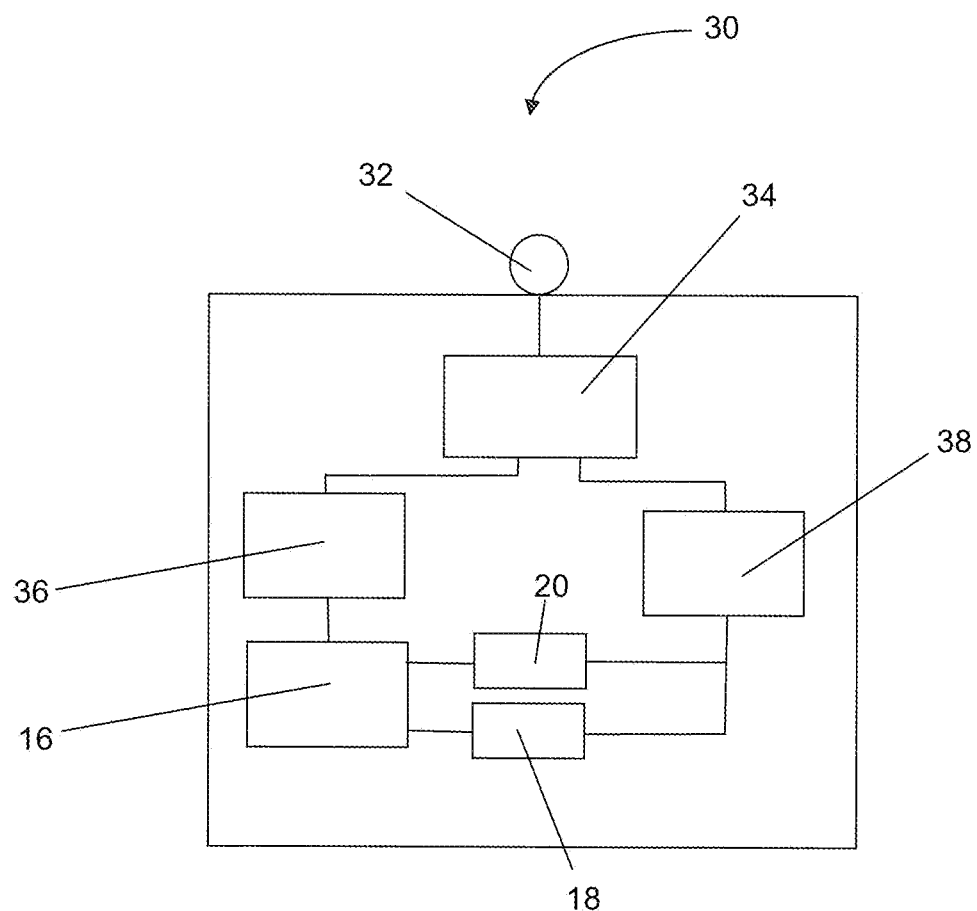
FIG. 2 is a schematic representation of a voice traffic gateway according to a second embodiment of the invention.

A second embodiment of the invention provides a voice traffic gateway 30 as shown in FIG. 2. The voice traffic gateway 30 of this embodiment is similar to the voice traffic gateway 10 of FIG. 1 with the following modifications. The same reference numbers are retained for corresponding features.

In this embodiment, the voice traffic input and the voice traffic output are provided as a shared communications port 32, arranged to be connected to a transmission network shared by both the first and second traffic domains.

The voice traffic gateway 30 comprises a first domain separator 36 and a second domain separator 38. The first domain separator is arranged to receive voice traffic and to read the domain identification label of each voice message and each signalling message received. The first domain separator is arranged to remove the domain identification label from each voice message and each signalling message having an identification label of the first traffic domain.

The second domain separator 38 is arranged to apply a second domain identification label to each voice message and each signalling message to be output to the second domain through the communications port 32.

The voice traffic gateway 30 further comprises routing apparatus 34 arranged to route voice traffic of the first domain received from the communications port to the first domain separator 36. The routing apparatus 34 is further arranged to route voice traffic to be output to the second domain from the second domain separator 38 to the communications port 32.

Figure 3:
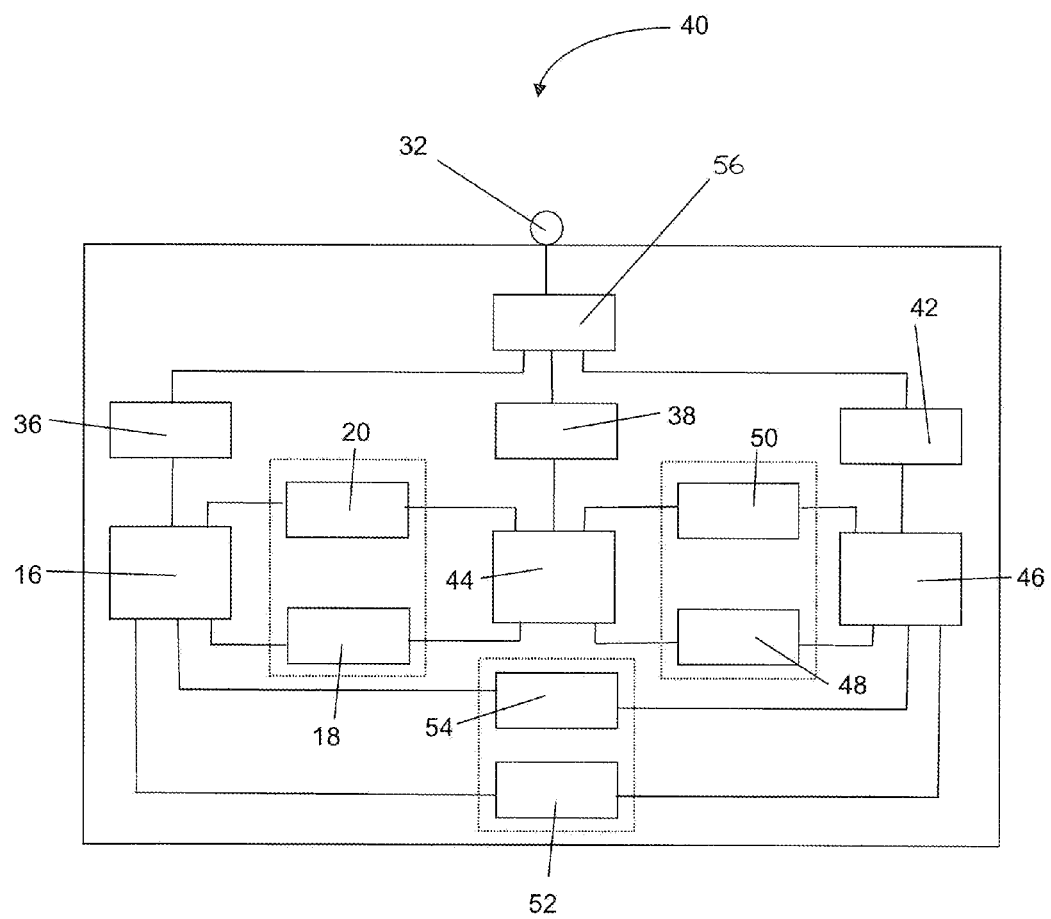
FIG. 3 is a schematic representation of a voice traffic gateway according to a third embodiment of the invention.

FIG. 3 shows a voice traffic gateway 40 according to a third embodiment of the invention. The voice traffic gateway 40 of this embodiment is similar to the voice traffic gateway 30 of FIG. 2 with the following modifications. The same reference numbers are retained for corresponding features.

In this embodiment, the voice traffic has a voice over internet protocol, VoIP, signal format and comprises voice message packets and signalling message packets.

The routing apparatus comprises encryption and routing apparatus 56. The encryption and routing apparatus 56 is arranged to decrypt voice traffic received from the communications 32 port and to route the decrypted traffic to the respective domain separator 36, 38, 42. The encryption and routing apparatus 56 is additionally arranged to encrypt traffic to be output prior to routing the encrypted output traffic to the communications port 32.

The voice traffic gateway 40 is arranged to receive voice traffic from each of three different traffic domains and to output voice traffic to each of the three traffic domains. The voice traffic gateway 40 comprises three domain separators 36, 38, 42, three domain routers 16, 44, 46 and three sets of non-secure warning tone application apparatus 18, 48, 52 and signalling filters 20, 50, 54.

Each domain separator 36, 38, 42 is arranged to receive voice traffic and to read the domain identification label of each voice message and each signalling message of the voice traffic. Each domain separator 36, 38, 42 is arranged to remove the respective domain identification label from each voice message and each signalling message having an identification label of its respective domain. Each domain separator 36, 38, 42 is additionally arranged to apply its respective domain identification label to each voice message and each signalling message to be output to its respective domain.

Each domain router 16, 44, 46 is coupled to a respective domain separator 36, 38, 42. Each domain router 16, 44, 46 is also coupled to at least one other domain router 16, 44, 46 through a non-secure warning tone application apparatus 20, 50, 54 and said signalling filter 18, 48, 52.

The first domain separator 36 and the first domain router 16 belong to a first traffic domain. The second domain separator 38 and the second domain router 44 belong to a second traffic domain. The third domain separator 42 and the third domain router 46 belong to a third traffic domain.

The first domain router 16 is connected to the second domain router 44 through a first non-secure warning tone application apparatus 20 and a first signalling filter 18. The second domain router 44 is connected to the third domain router 46 through a second non-secure warning tone application apparatus 50 and a second signalling filter 48. The first domain router 16 is also connected to the third domain router 46 through a third non-secure warning tone application apparatus 54 and a third signalling filter 52.

Each domain router 16, 44, 46 is arranged to read a destination address of each voice message and each signalling message received from its respective domain separator 36, 38, 42. The destination address is indicative of the destination domain. Each domain router 16, 44, 46 is arranged to route the voice messages and signalling messages to the respective non-secure warning tone application apparatus 20, 50, 54 or signalling filter 18, 48, 52 connected to the domain separator 36, 38, 42 of the destination domain.

Each domain router 16, 44, 46 is arranged to default route voice messages and signalling messages received from a respective non-secure warning tone application apparatus 20, 50, 54 or signalling filter 18, 48, 52 to the encryption and routing apparatus 56, through its respective domain separator 36, 38, 42.

Each non-secure warning tone application apparatus 20, 50, 54 and each signalling filter 18, 48, 52 is operable for bi-directional communication. Voice messages can therefore be transmitted from the first domain router 16 to the second domain router 44 through the first non-secure warning tone application apparatus 20, and vice versa. Voice messages can be transmitted from the first domain router 16 to the third domain router 46 through the third non-secure warning tone application apparatus 54, and vice versa. Voice messages can be transmitted from the second domain router 44 to the third domain router 46 through the second non-secure warning tone application apparatus 50, and vice versa.

Similarly, signalling messages can therefore be transmitted from the first domain router 16 to the second domain router 44 through the first signalling filter 18, and vice versa. Signalling messages can be transmitted from the first domain router 16 to the third domain router 46 through the third signalling filter 52, and vice versa. Signalling messages can be transmitted from the second domain router 44 to the third domain router 46 through the second signalling filter 48, and vice versa.

Voice traffic may therefore be transmitted between any pair of the three traffic domains.

Figure 4:
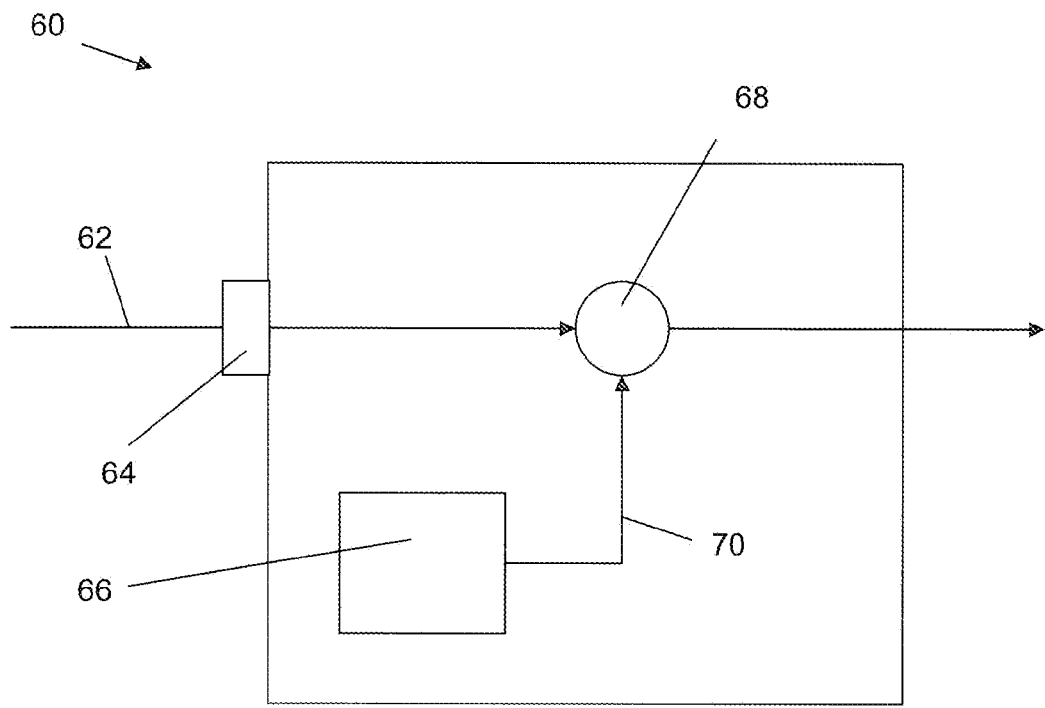
FIG. 4 is a schematic illustration of a non-secure warning tone application apparatus of a voice traffic gateway according to a fourth embodiment of the invention.

A fourth embodiment of the invention provides a voice traffic gateway comprising non-secure warning tone application apparatus 60 as shown in FIG. 4. The non-secure warning tone application apparatus 60 comprises a port 64, a non-secure warning tone signal source 66 and signal modification apparatus 68.

The port 64 is arranged to receive a voice message 62 comprising a voice signal comprising a sequence of voice samples.

The non-secure warning tone signal source 66 is arranged to generate a non-secure warning tone signal 70 comprising a plurality of tone samples. The signal modification apparatus 68 is arranged to modify the voice signal 62 by selectively including tone samples of the tone signal 70 in the sequence of voice samples.

A fifth embodiment of the invention provides a voice traffic gateway comprising non-secure warning tone application apparatus which is similar to the apparatus 60 shown in FIG. 4, with the following modifications. This embodiment will be described with reference to FIG. 4.

In this embodiment, the voice traffic has a voice over internet protocol, VoIP, signal format and comprises voice message packets and signalling message packets. The signal modification apparatus 68 is arranged to select some of the voice samples of the voice signal 62 and to replace each selected voice sample with a respective tone sample.

An sixth embodiment of the invention provides a voice traffic gateway comprising non-secure warning tone application apparatus which is similar to the apparatus 60 shown in FIG. 4, with the following modifications. This embodiment will be described with reference to FIG. 4.

In this embodiment, the voice traffic has a voice over internet protocol, VoIP, signal format and comprises voice message packets and signalling message packets. The signal modification apparatus 68 is arranged to select some of the voice samples of the voice signal 62 and to combine each selected voice sample with a respective tone sample to form a combined sample. In this example, the signal modification apparatus 68 is arranged to combine the voice and tone samples by taking a weighted average of each pair of voice sample and tone samples. The resulting voice signal therefore comprises a sequence of voice samples and combined samples.

A seventh embodiment of the invention provides a voice traffic gateway comprising non-secure warning tone application apparatus which is similar to the apparatus 40 shown in FIG. 4, with the following modifications. This embodiment will be described with reference to FIG. 4.

In this embodiment, the voice traffic has a voice over internet protocol, VoIP, signal format and comprises voice message packets and signalling message packets. The signal modification apparatus 68 is arranged to modify the voice signal 62 periodically, so that a non-secure warning tone is only applied to selected periods of a voice call, referred to as tone periods.

The method of this embodiment comprises modifying the voice signal only during tone periods. The tone periods are periodically occurring so that a periodic non-secure warning tone is applied to the voice signal. Applying a periodic non-secure warning tone may enable a receiving party to be made aware that they are holding a call with a non-trusted party without distracting the receiving party from the content of the call. This may ensure that the non-trusted party does not receive any indication (by, for example, the receiving party missing part of what is being said by the non-trusted party and requesting them to repeat it) that a non-secure warning tone is being heard by the receiving party. The non-trusted party may therefore be kept unaware of their non-trusted status.

Figure 5:
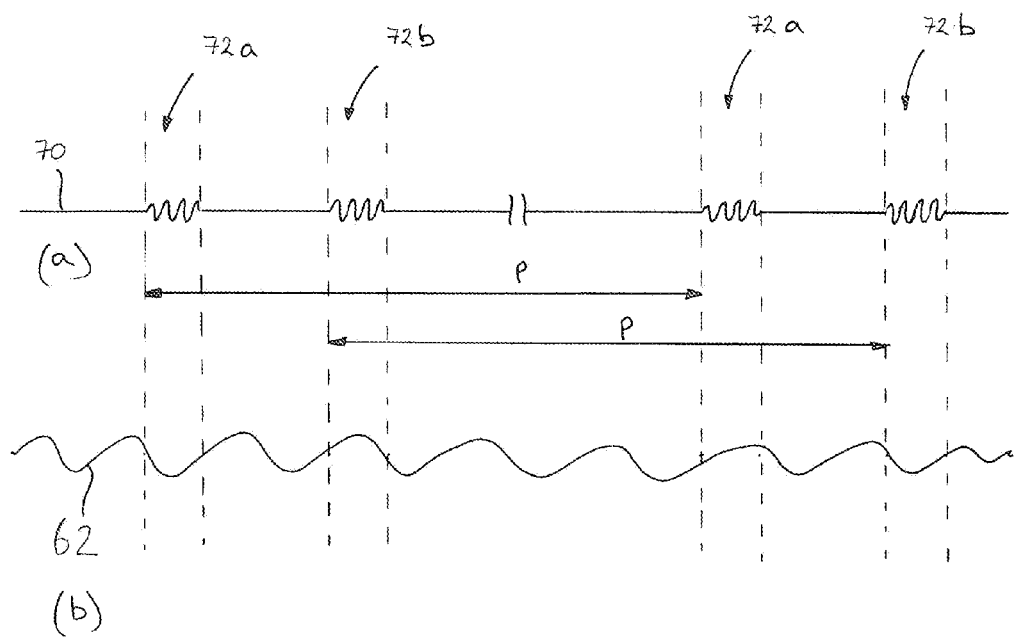
FIG. 5 is a graphical representation of audio patterns of (a) a voice call and (b) a non-secure warning tone signal to be merged with the voice call.

Referring to FIG. 5, which illustrates the audio patterns of the tone signal 70 and the voice signal 62, the tone signal 70 provides a tone samples during tone periods 72a, 72b, which repeat at a periodicity P. In this example, the non-secure warning tone signal source 66 is arranged to generate first tone samples arranged to provide a tone signal 70 at a first frequency tone, for example "beep", in the first tone periods 72a and to generate second tone samples arranged to provide a second frequency tone, for example "bop", in the second tone periods 72b. This results in a repeating "beep" "bop" non-secure warning tone being applied to the voice signal 62.

An eighth embodiment of the invention provides a voice traffic gateway comprising non-secure warning tone application apparatus which is similar to the apparatus 60 of the previous embodiment, with the following modifications. This embodiment will also be described with reference to FIG. 4.

In this embodiment, the voice signal has a voice over internet protocol (VoIP) signal format and comprises voice message packets and signalling message packets. The signal modification apparatus 68 is arranged to select alternate ones of the voice samples within each tone period and to replace each selected voice sample with a respective tone sample. A non-secure warning tone may thereby be applied to the voice signal which may be heard without obscuring the voice call and may maximise the intelligibility of a voice call having a non-secure warning tone on it.

A ninth embodiment of the invention provides a voice traffic gateway comprising non-secure warning tone application apparatus which is similar to the apparatus 60 of the previous embodiment, with the following modifications. This embodiment will also be described with reference to FIG. 4.

In this embodiment, the voice signal has a voice over internet protocol (VoIP) signal format. The signal modification apparatus 68 is arranged to select every fourth voice sample within each tone period and to replace each selected voice sample with a respective tone sample. This may reduce the amount of signal processing required by the signal modification apparatus 68 without affecting the intelligibility of the voice call.

The signal merging apparatus 68 may alternatively be arranged to select up to every sixteenth voice sample.

The non-secure warning tone signal source 66 is arranged to generate a non-secure warning tone signal 70 having a lower signal level than the voice signal 62 so that the voice call can be clearly heard over the non-secure warning tone during tone periods. This is advantageous in ensuring that the voice call is not corrupted or obscured during tone periods.

Figure 6:
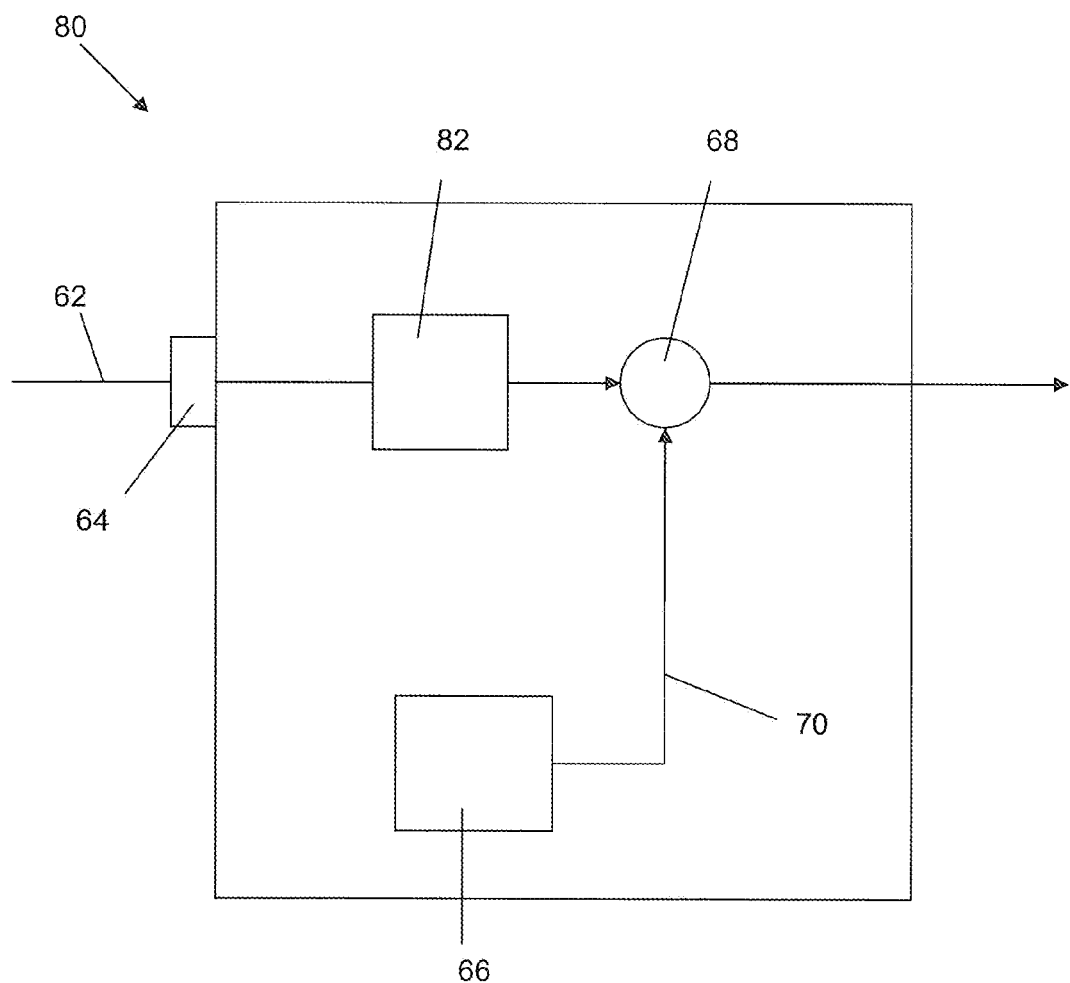
FIG. 6 is a schematic illustration of a non-secure warning tone application apparatus of a voice traffic gateway according to a fifth embodiment of the invention.

Referring to FIG. 6, a tenth embodiment of the invention provides a voice traffic gateway comprising non-secure warning tone application apparatus 80 which is similar to the non-secure warning tone application apparatus 60 shown in FIG. 4, with the following modifications. The same reference numbers are retained for corresponding features.

In this embodiment, the voice signal has a voice over internet protocol (VoIP) signal format and comprises voice message packets and signalling message packets. The sequence of voice samples is provided as a sequence of voice message packets. Each voice message packet has a packet length of 20 ms and comprises 160 voice samples each having a sample length of 0.125 ms. The apparatus 80 further comprises voice signal validation apparatus 82 arranged to compare a structural feature of a voice message packet of the voice signal 62 with a reference structural feature. The structural feature is selected from one of packet length, packet header and voice header. A voice message packet has a well known structure and will have a pre-selected length, packet header and voice header, each which may be stored as a reference structural feature. It will be appreciated that one or more of the structural features may be compared with the corresponding reference structural feature during the validation step. Other structural features may alternatively be used.

The validation apparatus 82 is further arranged to determine whether the selected structural feature is the same as the reference feature. If the structural feature is the same as the reference feature the voice signal validation apparatus 82 is arranged to validate the voice packet as comprising an acceptable voice packet. If the structural feature is not the same as the reference feature, the voice signal validation apparatus 82 is arranged to reject the voice packet as comprising an acceptable voice packet. The validation apparatus 82 is further arranged to discard any voice packet which is rejected as being acceptable. In this way unacceptable voice packets or data packets may be prevented from being transmitted by the non-secure warning tone application apparatus 80.

The invention claimed is:

1. A voice traffic gateway comprising:
   a voice traffic input arranged to receive voice traffic from a first traffic domain of a communications network, the voice traffic including voice messages and signalling messages;
   a voice traffic output arranged to deliver output voice messages and output signalling messages to a second, different traffic domain of the communications network;
   a first domain router coupled to the voice traffic input and configured to route voice messages received from the first traffic domain to a non-secure warning tone application apparatus and to route signalling messages received from the first traffic domain to a signalling filter;
   wherein the non-secure warning tone application apparatus is configured to apply a non-secure warning tone to each voice message that it receives to form a respective output voice message; and
   the signalling filter is configured to compare a feature of each signalling message that it receives with a reference feature, to pass said signalling message as an output signalling message if said feature is the same as the reference feature, and to block said signalling message if said feature is not the same as the reference feature.

2. A voice traffic gateway as claimed in claim 1, configured to receive voice messages and signalling messages from the first traffic domain which include a first domain identification label, wherein the voice traffic input and the voice traffic output are configured to use a shared communications port, the voice traffic gateway comprising:
   a first domain separator configured to receive the voice traffic and to read a domain identification label of each voice message and each signalling message, and to remove the first domain identification label from each voice message and each signalling message having a domain identification label of the first traffic domain;
   a second domain separator configured to apply a second domain identification label to each voice message and each signalling message to be output to the second domain; and
   a routing apparatus configured to route voice traffic received from the first traffic domain from the communications port to the first domain separator, and to route voice traffic to be output to the second domain from the second domain separator to the communications port.

3. A voice traffic gateway as claimed in claim 2, wherein the voice traffic gateway is arranged to receive voice traffic from each of a plurality of different traffic domains and to output voice traffic to each of said traffic domains, the voice traffic gateway comprising:
   a plurality of domain separators each configured to receive respective voice traffic and to read a domain identification label of each voice message and each signalling message of said voice traffic, and to remove the respective domain identification label from each voice message and signalling message having an identification label of its respective domain and to apply said respective domain identification label to each voice message and each signalling message to be output to its respective domain;
   a plurality of non-secure warning tone application apparatus and signalling filters; and
   a plurality of domain routers, each coupled to a respective domain separator and to at least one other domain router through a respective non-secure warning tone application apparatus and a respective signalling filter,
   wherein each domain router is configured to route voice traffic received from its respective domain separator to a respective non-secure warning tone application apparatus or a respective signalling filter, and each domain router is configured to route voice traffic received from a respective non-secure warning tone application apparatus or a respective signalling filter to its respective domain separator.

4. A voice traffic gateway as claimed in claim 2, wherein the routing apparatus is configured to decrypt voice traffic received from the communications port prior to routing said voice traffic to a respective domain separator, and is to encrypt voice traffic to be output prior to routing said voicetraffic to the communications port.

5. A voice traffic gateway as claimed in claim 1, configured to receive signalling messages having at least one of a source address, a destination address, a signalling message format, and content of a signalling message field.

6. A voice traffic gateway as claimed in claim 1, configured to receive signalling messages having a bit rate, wherein the signalling filter is configured to control the bit rate to be not greater than a pre-selected threshold bit rate.

7. A voice traffic gateway as claimed in claim 6, configured to receive signalling messages having signalling packets, wherein the signalling filter is configured to:
   convert received signalling packets into a first serial bit stream;
   convert the first serial bit stream into a second serial bit stream having a pre-selected, lower bit rate; and
   convert the second serial bit stream into output signalling packets.

8. A voice traffic gateway as claimed in claim 1, wherein each traffic domain has a trust level and the non-secure warning tone apparatus is configured to apply the non-secure warning tone only to messages being sent from a traffic domain having a first trust level to a traffic domain having a second, higher trust level.

9. A voice traffic gateway as claimed in claim 1, configured to receive voice messages which include a voice signal comprising a sequence of voice samples, wherein the non-secure warning tone application apparatus comprises:
   a port arranged to receive a said voice signal;
   a non-secure warning tone signal source arranged to generate a non-secure warning tone signal having a plurality of tone samples; and
   a signal modification apparatus arranged to selectively include tone samples in the sequence of voice samples.

10. A voice traffic gateway as claimed in claim 9, wherein the signal modification apparatus is configured to select a plurality of the voice samples, and to replace each selected voice sample with a respective tone sample.

11. A voice traffic gateway as claimed in claim 9, wherein the signal modification apparatus is configured to select a plurality of the voice samples, and to combine each selected voice sample with a respective tone sample to form a combined sample.

12. A voice traffic gateway as claimed in claim 11, wherein each combined sample will comprise:
   a weighted average of the respective voice sample and tone sample.

13. A voice traffic gateway as claimed in claim 10, wherein the signal modification apparatus is configured to select alternate voice samples.

14. A voice traffic gateway as claimed in claim 10, wherein the signal modification apparatus is configured to select one in up to every sixteen voice samples.

15. A voice traffic gateway as claimed in claim 9, wherein the sequence of voice samples comprises:
   a sequence of voice message packets, and the signal modification apparatus comprises:
   a voice signal validation apparatus configured to compare a structural feature of a voice message packet of the voice signal with a reference structural feature, to determine whether said structural feature is the same as said reference feature, and if said structural feature is the same as said reference feature to validate the voice message packet as including an acceptable voice message packet.

16. A voice traffic gateway as claimed in claim 15, wherein said structural feature comprises:
   at least one of packet length, packet header and voice header.

* * * * *